US012300914B2

(12) United States Patent
Fu

(10) Patent No.: US 12,300,914 B2
(45) Date of Patent: May 13, 2025

(54) ELECTRICAL CONNECTION CLAMP

(71) Applicant: Hainan Xunwei Technology Co., Ltd., Haikou (CN)

(72) Inventor: Gonghai Fu, Hainan (CN)

(73) Assignee: Hainan Xunwei Technology Co., Ltd., Haikou (CN)

(*) Notice: Subject to any disclaimer, the term of this patent is extended or adjusted under 35 U.S.C. 154(b) by 0 days.

(21) Appl. No.: 18/369,738

(22) Filed: Sep. 18, 2023

(65) Prior Publication Data

US 2024/0313442 A1 Sep. 19, 2024

(30) Foreign Application Priority Data

Mar. 16, 2023 (CN) ......................... 202320516524.0

(51) Int. Cl.
*H01R 11/24* (2006.01)

(52) U.S. Cl.
CPC .................................... *H01R 11/24* (2013.01)

(58) Field of Classification Search
CPC ....................................................... H01R 11/24
See application file for complete search history.

(56) References Cited

U.S. PATENT DOCUMENTS

| | | | | |
|---|---|---|---|---|
| 9,647,355 | B1 * | 5/2017 | Ye | H01R 11/24 |
| 9,819,113 | B2 * | 11/2017 | Adams | H01R 13/4532 |
| 9,923,289 | B2 * | 3/2018 | Bertness | G01R 31/364 |
| 11,095,051 | B2 * | 8/2021 | Dai | H02J 1/122 |
| D984,383 | S * | 4/2023 | Koebler | D13/120 |
| 2009/0247020 | A1 * | 10/2009 | Gathman | H01R 11/24 439/759 |

* cited by examiner

*Primary Examiner* — Travis S Chambers
(74) *Attorney, Agent, or Firm* — Westbridge IP LLC

(57) ABSTRACT

The present disclosure provides an electrical connection clamp, which includes an elastic member, a first clamp arm and a second clamp arm that are rotatably connected to each other. The first clamp arm includes a first metal part and a first insulation part connected to the outer surface of the first metal part. The first metal part includes a first metal clamping portion and at least one first cable connection portion. The second clamp arm includes a second metal part and a second insulation part connected to the outer surface of the second metal part. The second metal part includes a second metal clamping portion. At least one first cable connection portion is electrically connected to the second metal part. When the first clamp arm and the second clamp arm are in a clamping state, the elastic member can be deformed elastically to provide clamping force.

7 Claims, 7 Drawing Sheets

ELECTRICAL CONNECTION CLAMP

CROSS-REFERENCE TO RELATED APPLICATIONS

The present disclosure claims priority to Chinese Patent Application No. 2023205165240, filed on Mar. 16, 2023, and entitled "ELECTRICAL CONNECTION CLAMP," the entire contents of which are incorporated by reference in the present disclosure.

TECHNICAL FIELD

The present disclosure relates to the field of portable backup starting devices for vehicles, in particular to an electrical connection clamp.

BACKGROUND ART

The electrical connection clamp is a clamp used for electrically connecting with the battery of the vehicle, which can connect the electrode of the battery to a power source to transmit electrical power. At present, the existing electrical connection clamp is usually composed of metal parts, insulation parts, and elastic members. The metal part can play a role of conducting electrical power, the insulation part can ensure the safety of users, and the two arms of the elastic member can realize opening and closing of the electrical connection clamps. However, the conductive performance of the existing electrical connection clamps is not stable and cannot meet the needs of users.

SUMMARY

In view of this, the purpose of the present disclosure is to provide an electrical connection clamp, and an improved electrical connection clamp is needed to solve the problems such as unstable conductive performance of the existing electrical connection clamp.

According to the above purpose, the present disclosure provides an electrical connection clamp, which includes an elastic member, a first clamp arm and a second clamp arm that are rotatably connected to each other, wherein the first clamp arm includes a first metal part and the first insulation part connected to the outer surface of the first metal part, and the first metal part includes a first metal clamping portion and at least one first cable connection portion. The second clamp arm includes a second metal part and the second insulation part connected to the outer surface of the second metal part, wherein the second metal part includes a second metal clamping portion.

The at least one first cable connection portion is electrically connected to the second metal part.

When the first clamp arm and the second clamp arm are in a clamping state, the elastic member can be deformed elastically to provide clamping force.

Preferably, the first insulation part is rotatably connected to the second insulation part through a rotating part.

Preferably, the elastic member includes a through hole, a first arm portion and a second arm portion, wherein the first arm portion is in contact with the inner surface of the first insulation part, and the second arm portion is in contact with the inner surface of the second insulation part.

Preferably, the rotating part does not extend into or passes through the through hole.

Preferably, the second metal part further includes a second cable connection portion, and the at least one first cable connection portion is electrically connected to the second cable connection portion.

Preferably, a cable is also included, wherein the first metal part includes one first cable connection portion, and the first cable connection portion is connected to the second cable connection portion through the cable. The number of the cables connected to the first cable connection portion is greater than the number of the cables connected to the second cable connection portion.

Preferably, a cable is also included, the first metal part includes one first cable connection portion, and the first cable connection portion is connected to the second cable connection portion through the cable. The surface area of the first cable connection portion is larger than that of the second cable connection portion.

Preferably, the first metal part and the second metal part are arranged on the same side of the axis of the rotating part.

Preferably, the first insulation part includes a first insulation handle portion, a first insulation clamping portion corresponding to the first metal clamping portion, and a first accommodating groove opening toward the first metal part.

Preferably, the first insulation part is snapped to the outer surface of the first metal part and/or connected to the outer surface of the first metal part through a first screw.

Preferably, the first insulation part includes a first convex portion disposed in the first accommodating groove for snapping.

Preferably, the first convex portion further includes a barb portion for fixing.

Preferably, the first metal part is rotatably connected to the second metal part through a rotating part.

Preferably, the elastic member includes a through hole, a first arm portion and a second arm portion, wherein the first arm portion is in contact with the inner surface of the first clamp arm, and the second arm portion is in contact with the inner surface of the second clamp arm. The first arm portion has a length different from that of the second arm portion.

Preferably, the second metal part further includes a second cable connection portion, and the first metal part includes two first cable connection portions, wherein the first cable connection portion close to the first metal clamping portion is electrically connected to the second cable connection portion.

Preferably, the elastic member includes a through hole, a first arm portion and a second arm portion, wherein the first arm portion is in contact with the inner surface of the first metal part to form a first contact portion. At least one first cable connection portion is disposed between the first contact portion and the first metal clamping portion.

Preferably, the first metal part includes a first metal handle portion, the first insulation part includes a first insulation handle portion corresponding to the first metal handle portion, and the first insulation handle portion includes at least one first side portion, wherein the first side portion forms at least one first limiting portion for limiting the movement of the first metal handle portion.

Preferably, the elastic member includes a through hole, a first arm portion and a second arm portion, wherein the first arm portion is in contact with the inner surface of the first clamp arm, and the second arm portion is in contact with the inner surface of the second clamp arm. The end of the first arm portion away from the through hole is provided with a first bent portion.

Preferably, the first bent portion is provided with a second bent portion that arches towards the direction facing away from the inner surface of the first clamp arm.

Preferably, the first metal part and the second metal part respectively include a first metal sub-part and a second metal sub-part.

According to the electrical connection clamp of the present disclosure, the opening and the closing of the electrical connection clamp can be realized by rotatably connecting the first clamp arm and the second clamp arm, the conductive effect of the electrical connection clamp is realized through the first metal clamping portion and the second metal clamping portion, and the safety of the user during use can be ensured through the first insulation part and the second insulation part. By electrically connecting the first cable connection portion with the second metal part, both the first metal part and the second metal part have strong electrical conductivity, thereby increasing the conductive performance of the electrical connection clamp in use, and making the conductive performance of the electrical connection clamp stable in use.

In order to make the above-mentioned purposes, features and advantages of the present disclosure clearer, the preferred embodiments will be described in detail below together with the drawings.

BRIEF DESCRIPTION OF DRAWINGS

In order to more clearly illustrate the technical solutions of the embodiments of the present disclosure, the drawings that are required in the embodiments will be briefly introduced below. It should be understood that the following drawings only show some embodiments of the present disclosure, and therefore should not be regarded as a limitation on the scope, and those ordinarily skilled in the art can also obtain other related drawings based on these drawings without inventive effort.

Figure 1:
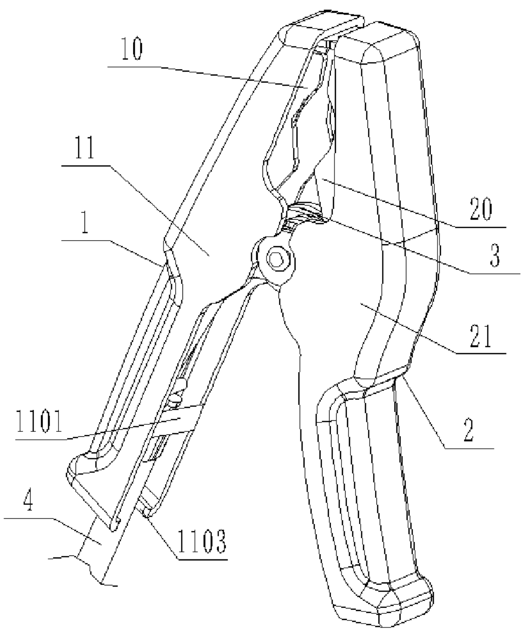
FIG. 1 is a schematic view of the electrical connection clamp when the first metal part and the second metal part are connected according to the present disclosure.
Figure 2:
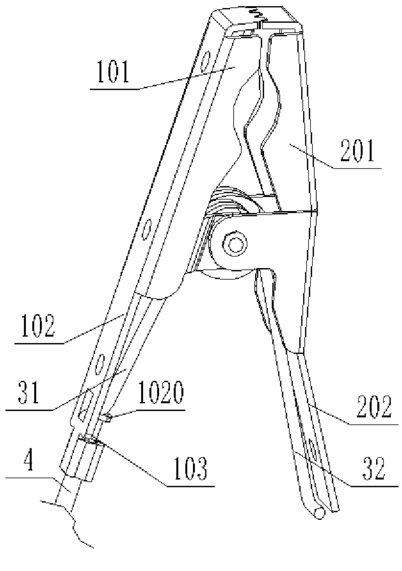
FIG. 2 is a schematic view of the connection between the first metal part and the second metal part when the first metal part and the second metal part are connected according to the present disclosure.
Figure 3:
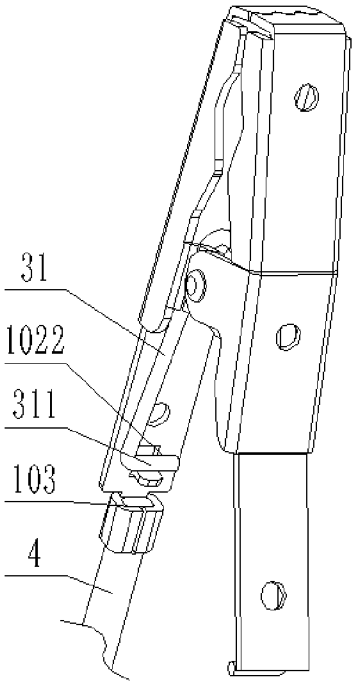
FIG. 3 is another schematic view of connection between the first metal part and the second metal part when the first metal part and the second metal part are connected according to the present disclosure.
Figure 4:
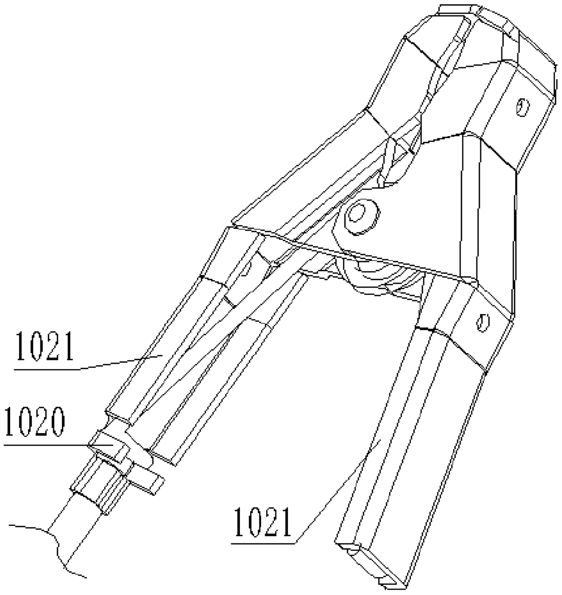
FIG. 4 is another schematic view of the connection between the first metal part and the second metal part when the first metal part and the second metal part are connected according to the present disclosure.

Reference numerals: 1—first clamp arm; 10—first metal part; 101—first metal clamping portion; 1010—positioning hole; 102—first metal handle portion; 1020—second limiting portion; 1021—third limiting portion; 1022—first contact portion; 103—first cable connection portion; 11—first insulation part; 110—first insulation handle portion; 1101—baffle plate; 1102—first limiting portion; 1103—cable hole; 1104—retaining bar; 1105—first side portion; 111—first insulation clamping portion; 1110—first convex portion; 11101—barb portion; 112—first accommodating groove; 2—second clamp arm; 20—second metal part; 201—second metal clamping portion; 202—second metal handle portion; 203—second cable connection portion; 21—second insulation part; 3—elastic member; 30—through hole; 31—first arm portion; 310—second bent portion; 311—first bent portion; 32—second arm portion; 4—cable.

DETAILED DESCRIPTION OF EMBODIMENTS

The following detailed description is provided to assist the reader in gaining an overall understanding of the methods, apparatuses and/or systems described herein. However, various changes, modifications, and equivalents of the methods, apparatuses, and/or systems described herein will be apparent upon understanding the content of the present disclosure. For example, the order of operations described herein is an example only and the operations are not limited to the order set forth herein. Except for operations that must occur in a particular order, changes that will be apparent after understanding the content of the present disclosure can be made. Furthermore, descriptions of features that are known in the art can be omitted for increased clarity and conciseness.

The features described herein can be implemented in different forms and should not be construed as being limited by the examples described herein. More specifically, the examples described herein have been provided merely to illustrate some of the many possible ways of implementing the methods, apparatuses and/or systems described herein that will be apparent after understanding the content of the present disclosure.

Throughout the specification, when an element (such as a layer, region, or substrate) is described as being "on" another element, "connected to" another element, "coupled to" another element, "above" another element or "covering" another element, the element can be directly "on" another element, "connected to" another element, "coupled to" another element, "above" another element or "cover" another element, or one or more other elements can be provided therebetween. In contrast, when an element is described as being "directly on" another element, "directly connected to" another element, "directly coupled to" another element, "directly above" another element or "directly covering" another element, other elements can be not arranged therebetween.

As used herein, the term "and/or" illustrates including any one and any combination of any two or more of the listed associated items.

Although terms such as "first", "second" and "third" can be used herein to describe various elements, components, regions, layers or sections, these elements, components, regions, layers or sections are not constrained by these terms. More specifically, these terms are only used to distinguish one element, component, region, layer or section from another element, component, region, layer or section. Thus, a first element, component, region, layer or section in examples described herein can be termed a second element, component, region, layer or section without departing from the teaching of the examples.

For ease of description, spatial-relationship terms such as "on", "upper", "below" and "lower" can be used herein to describe the relationship between one element and another as shown in the drawings. Such spatial-relationship terms are intended to encompass orientations depicted in the figures as well as different orientations of the device in use or in operation. For example, if the device in the figures is turned over, elements described as being "on" or "above" other elements would then be located "below" or "under" the other elements. Thus, the term "on" encompasses both orientations of "on" and "below" depending on the spatial orientation of the device. The device can be otherwise oriented (e.g. rotated by 90 degrees or at other orientations) and the spatial-relationship terms used herein are interpreted accordingly.

The terms used herein are only used to describe various examples and are not used to limit the present disclosure. Unless the context clearly dictates otherwise, singular forms are intended to include plural forms. The terms "include", "contain" and "having" enumerate existing stated features, quantities, operations, elements, components and/or combinations thereof, but do not exclude the presence or addition of one or more other features, quantities, operations, components, elements and/or combinations thereof.

Variations in the shapes shown in the figures occur due to manufacturing techniques and/or tolerances. Accordingly, examples described herein are not limited to the specific shapes shown in the drawings but include changes in shapes that occur during manufacture.

The features of the examples described herein can be combined in various ways that will be apparent after understanding the content of the present disclosure. Furthermore, while the examples described herein have a variety of configurations, other configurations are also possible, as will be apparent after understanding the content of the present disclosure.

According to the present disclosure, an electrical connection clamp is provided, as shown in FIG. 1-FIG. 13. The electrical connection clamp in the present disclosure includes a first clamp arm 1 and a second clamp arm 2 that are rotatably connected to each other, wherein the first clamp arm 1 includes a first metal part 10 and a first insulation part 11 connected to or covering the outer surface of the first metal part 10. The second clamp arm 2 includes a second metal part 20 and a second insulation part 21 connected to or covering the outer surface of the second metal part 20. Although not being shown in the figures, the first metal part 10 or the second metal part 20 should have at least one layer of metal sub-part, wherein the metal sub-part is made of conductive material, and the conductive material can be copper, brass, metal alloy, steel alloy, plated steel, chrome-plated steel, nickel-plated steel, aluminum or other suitable conductive materials. Each layer of metal sub-part can be made of different materials in the above-mentioned suitable conductive materials. For example, the first metal part 10 or the second metal part 20 includes a first metal sub-part and a second metal sub-part, wherein the first metal sub-part close to the first insulation part 11 or the second insulation part 21 is made of a steel alloy, and the second metal sub-part away from the first insulation part 11 or the second insulation part 21 is made of brass. The first metal sub-part and the second metal sub-part can be mechanically connected by threaded connection or the like. The second metal sub-part of the first metal part 10 and the second metal sub-part of the second metal part 20 can be electrically connected through a conductive part such as a cable. The first insulation part 11 or the second insulation part 21 is made of an electrical insulation material, such as plastic, rubber, glass fiber, resin or other suitable electrical insulation materials.

In addition, the electrical connection clamp also includes an elastic member 3 and at least one first cable connection portion 103. The elastic member 3 is provided with a through hole 30, a first arm portion 31 and a second arm portion 32, wherein the through hole 30 is disposed at the position where the first clamp arm 1 and the second clamp arm 2 are rotatably connected. The first arm portion 31 and the second arm portion 32 are respectively located on the side portions of the first clamp arm 1 and the second clamp arm 2 that face each other, that is, the first arm portion 31 and the second arm portion 32 are in contact with the inner surfaces of the first clamp arm 1 and the second clamp arm 2 respectively, such that when the first clamp arm 1 and the second clamp arm 2 are in clamping state, the elastic member 3 can be deformed elastically to provide a clamping force. At least one first cable connection portion 103 is electrically connected to the second metal part 20.

Hereinafter, specific connection methods and functions of the above-mentioned components of the electrical connection clamp according to the present disclosure will be described in detail.

In the embodiment, the first clamp arm 1 and the second clamp arm 2 can be rotatably connected in such a way that the first metal part 10 and the second metal part 20 are rotatably connected by a rotating part, or that the first insulation part 11 and the second metal part 21 are rotatably connected by a rotating part. The rotating part can be an independent part or integrally formed with the first metal part 10, the second metal part 20, the first insulation part 11 or the second insulation part 21.

Figure 12:
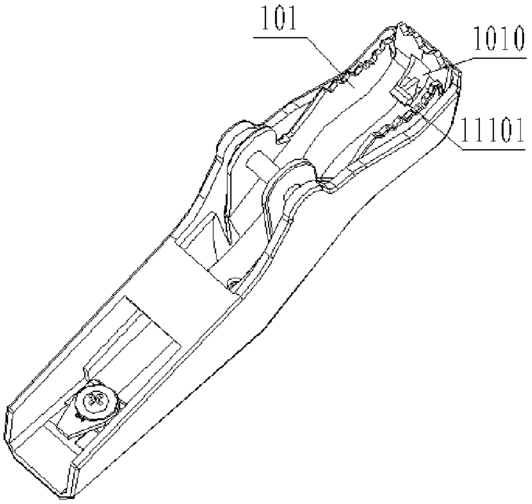
FIG. 12 is another schematic view of the first clamp arm when the first insulation part and the second insulation part are connected according to the present disclosure.
Figure 13:
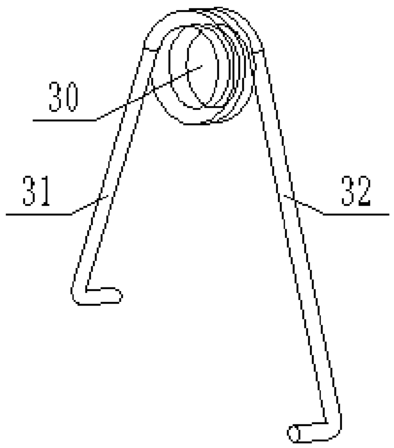
FIG. 13 is a schematic view of an elastic member according to the present disclosure.

As for the electrical connection clamp, the elastic member 3 is disposed between the side portions of the first clamp arm 1 and the second clamp arm 2 that face each other when the first metal part 10 and the second metal part 20 are rotatably connected. Specifically, as shown in FIG. 1 to FIG. 8, the first metal part 10 is provided with a first metal clamping portion 101, a first metal handle portion 102 and a first cable connection portion 103 for connecting to the cable 4. The cable 4 includes a first conductor and a first protective cover, wherein the first conductor of cable 4 is electrically connected to the first cable connection portion 103 in many ways. For example, the cable 4 is threadedly connected to the first cable connection portion 103 having a through hole via a conductive terminal with through hole (as shown in FIG. 12), or the first conductor of the cable 4 is directly connected to the first cable connection portion 103. The first insulation part 11 is provided with a first accommodating groove 112 with an opening toward the first metal part 10, and the first insulation part 11 is sequentially provided with the first insulation clamping part 111 and the first insulation handle portion 110 corresponding respectively to the first metal clamping portion 101 and the first metal handle portion 102.

In addition, the second metal part 20 is provided with a second metal clamping portion 201 and a second metal handle portion 202. The second insulation part 21 is provided with a second accommodating groove with an opening toward the second metal part 20, and the second insulation part 21 is sequentially provided with a second insulation clamping portion and a second insulation handle portion corresponding respectively to the second metal clamping portion 201 and second metal handle portion 202. At this time, the through hole 30 of the elastic member 3 is provided at the position where the first metal part 10 and the second metal part 20 are rotatably connected, wherein the rotating part (such as a rotary pin) does not extend into or extends into or passes through the through hole 30. When using one rotating part, the rotating part passes through the through hole and is connected respectively to the first metal part 10 and the second metal part 20 at two ends in its extending direction; and when using two rotating parts, these two rotating parts do not extend into or extend into the through hole 30, wherein one of the rotating parts can be an independent part (such as a rotary pin), which is connected with the first metal part 10 and/or the second metal part 20 on one side, or can also be integrally formed with the first metal part 10 or the second metal part 20, such that the rotatable connection between the first metal part 10 and the second metal part 20 can be achieved on one side; and the other rotating part can be an independent part (such as a rotary pin), which is connected with the first metal part 10 and/or the second metal part 20 on the other side or integrally formed with the first metal part 10 or the second metal part 20, such that the rotatable connection between the first metal part 10 and the second metal part 20 can be achieved on the other side.

In addition, the elastic member 3 can be connected with the first clamp arm 1 and the second clamp arm 2 in such a way that the first arm portion 31 and the second arm portion 32 abut against the opposite side portions of the first metal handle portion 102 and the second metal handle portion 202 respectively, or that the first arm portion 31 and the second arm portion 32 respectively abut against the opposite side portions of the first insulation handle portion 110 and the second insulation handle portion. In this way, the relative rotation between the first metal part 10 and the second metal part 20 can be realized, that is, the opening and closing of the first metal clamping portion 101 and the second metal clamping portion 201 can be realized, thereby realizing the opening and closing of the electrical connection clamp to makes it easier to be connected to the electrode of battery or to be removed after charging.

Figure 5:
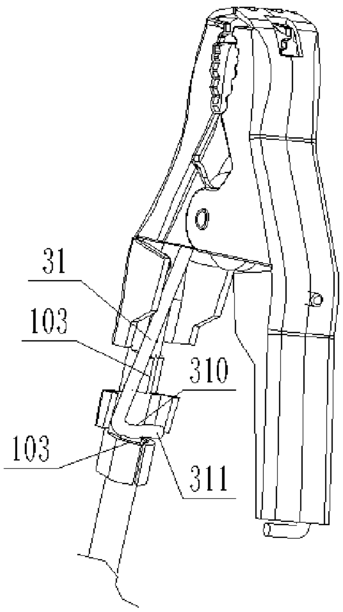
FIG. 5 is another schematic view of the connection between the first metal part and the second metal part when the first metal part and the second metal part are connected according to the present disclosure.
Figure 6:
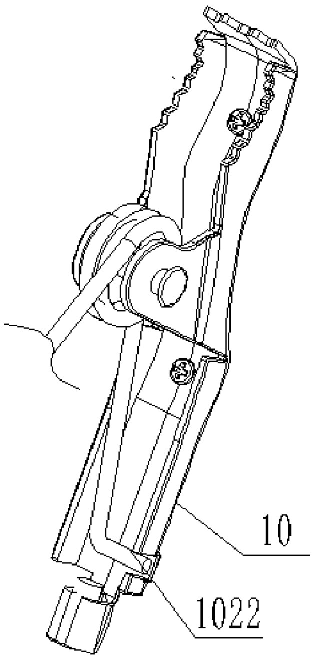
FIG. 6 is a schematic view of the first metal part when the first metal part and the second metal part are connected according to the present disclosure.
Figure 11:
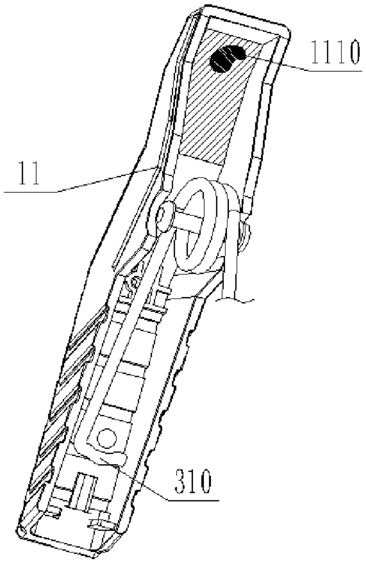
FIG. 11 is a schematic view of the first clamp arm when the first insulation part and the second insulation part are connected according to the present disclosure.

Furthermore, as shown in FIG. 2 to FIG. 5, the end of the first arm portion 31 away from the through hole 30 is formed as a first bent portion 311 with a bent structure, which is configured to compress the cable 4 and/or abuts against the first clamp arm 1. In other words, the first arm portion 31 is formed in an L-shaped structure, wherein its vertical edge extends along the length direction of the first metal handle portion 102, and its horizontal edge extends along the width direction of the first metal handle portion 102. In addition, the first contact portion 1022 is formed at the position where the first arm portion 31 is in contact with the first metal part 10 or the first insulation part 11, wherein the above first cable connection portion 103 can be provided between the first contact portion 1022 and the first metal clamping portion 101 (as shown in FIG. 5), or can be disposed on a side of the first contact portion 1022 away from the first metal clamping portion 101 (shown in FIG. 2 and FIG. 3). The first cable connection portion 103 is disposed between the first contact portion 1022 and the first metal clamping portion 101, which can increase the stability when the first cable connection portion 103 is connected to the cable 4, thereby ensuring the stability of power transmission. In addition, the horizontal side of the first arm portion 31 is provided with a convex portion arched away from the cable 4, that is, the second bent portion 310 (as shown in FIG. 5 and FIG. 11), and the convex portion matches with the cable 4, such that the cable 4 can be fixed from the top of the cable 4 through the convex portion, thereby increasing the stability of the overall structure of the electrical connection clamp.

In addition, the second arm portion 32 is also formed as an L-shaped bent structure similar to the first arm portion 31, but the length of the first arm portion 31 is not equal to the length of the second arm portion 32. For example, in this embodiment, the length of the first arm portion 31 is configured to be shorter than the length of the second arm portion 32, but the specific lengths of the two are not limited, as long as the above-mentioned technical effects of the electrical connection clamp can be guaranteed, and meanwhile materials can be saved to the greatest extent so as to save production costs.

Figure 7:
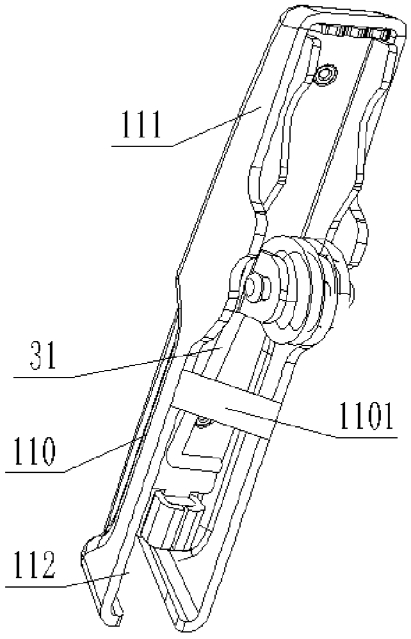
FIG. 7 is a schematic view of the first clamp arm when the first metal part and the second metal part are connected according to the present disclosure.
Figure 8:
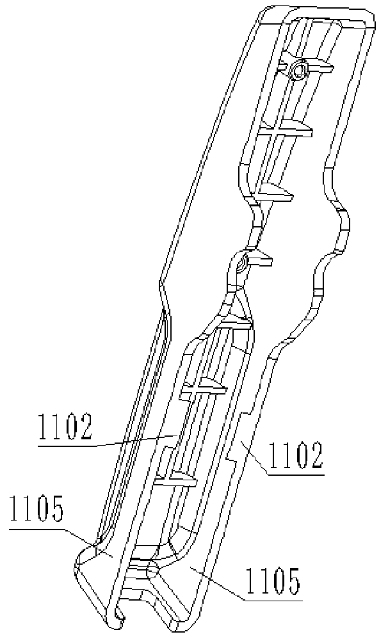
FIG. 8 is a schematic view of the first insulation part when the first metal part and the second metal part are connected according to the present disclosure.
Figure 9:
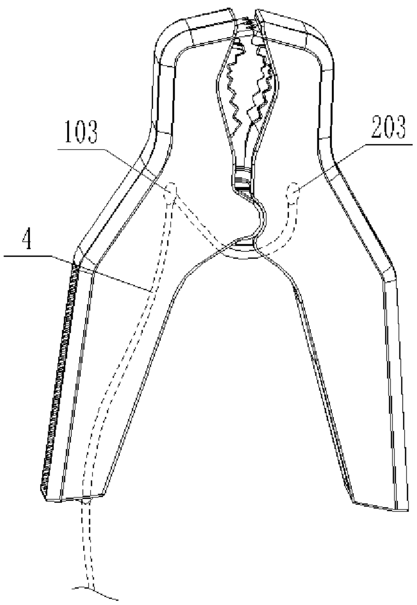
FIG. 9 is a schematic view of the electrical connection clamp when the first insulation part and the second insulation part are connected according to the present disclosure.
Figure 10:
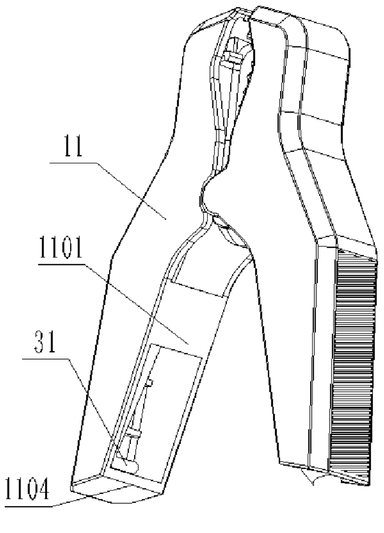
FIG. 10 is another schematic view of the electrical connection clamp when the first insulation part and the second insulation part are connected according to the present disclosure.

In this embodiment, the first insulation handle portion 110 includes at least one first side portion 1105, wherein the first side portion 1105 is provided with at least one first limiting portion 1102 for limiting the movement of the first metal handle portion. When the first insulation handle portion 110 includes three first side portions, which are respectively the first sub-first side portion, the second sub-first side portion and the third sub-first side portion, the first sub-first side portion and the second sub-first side portion are respectively provided with at least one first limiting portion 1102 for restricting the movement of the first metal handle portion 102, wherein one first limiting portion 1102 of the first sub-first side portion communicates with one first limiting portion 1102 of the second sub-first side portion to form a baffle plate 1101 (as shown in FIG. 7). In addition, in order to realize the position limitation of the first metal part 10 and the second metal part 20, the shape and size of the first accommodating groove 112 and the second accommodating groove should be adapted to those of the first metal part 10 and the second metal part 20 respectively, thereby limiting the movement of the first metal part 10 and the second metal part 20 in multiple directions such as the length direction, the width direction, and the direction perpendicular to the plane where the length and width are located.

Furthermore, the baffle plates 1101 are respectively located at the openings of the first accommodating groove 112 and the second accommodating groove close to the rotating part, and in contact with the first metal part 10 or the second metal part 20, that is, the baffle plate 1101 can restrict the first metal part 10 or the second metal part 20 from detaching from the first accommodating groove 112 or the second accommodating groove, thereby further improving the stability of the overall structure of the electrical connection clamp. When assembling, the first metal part 10 or the second metal part 20 slides below the baffle plate 1101 of the first insulation handle portion 110 or the handle portion of the second insulation part respectively, until the first metal part 10 or the second metal part 20 reach the preset position. In addition, an opening corresponding to the cable 4 is formed on the first insulation handle portion 110 to form a cable hole 1103, so as to facilitate the connection between the cable 4 and the first metal part 10.

In addition, in this embodiment, as shown in FIG. 1 to FIG. 8, a second limiting portion 1020 is formed on the side of the first metal handle portion 102 facing the elastic member 3, and the second limiting portion 1020 abuts against the horizontal side of the first arm portion 31, so as to limit the movement of the first arm portion 31 along the length direction of the first metal handle portion 102, thereby improving the stability of the connection between the elastic member 3 and the first metal part 10.

In addition, in this embodiment, in order to improve the stability of the connection between the first arm portion 31 and the second arm portion 32, a third limiting portion 1021 connected to the first arm portion 31 is provided along the width direction of the first metal handle portion 102. When the first metal handle portion 102 is formed as a U-shaped open structure, the two side walls of the open structure are formed as the third limiting portion 1021, that is, the length of the horizontal side of the first arm portion 31 is configured as equal to the width of the open structure, such that the opposite side walls of the open structure can limit the movement of the first arm portion 31 along the width direction of the first metal handle portion 102. But it is not limited to this, when the first metal handle portion 102 is formed as a plate-shaped structure, the above first side portion 1105 of the first insulation handle portion 110 can be formed as the above third limiting portion 1021 (as shown in FIG. 1 and FIG. 7) so as to limit the first metal handle portion 102. Similarly, a third limiting portion 1021 connected to the second arm portion 32 is also formed along the width direction of the second metal handle portion 202, wherein the third limiting portion 1021 can limit the movement of the second arm portion 32.

In this embodiment, as shown in FIG. 5, when the first metal part 10 includes two first cable connection portions 103, the second metal part 20 also includes a second cable connection portion 203, and the first cable connection portion 103 close to the first metal clamping portion 101 is conductively connected to the second cable connection portion 203.

Furthermore, the first metal part 10 and the second metal part 20 include respectively a first metal sub-part and a second metal sub-part, wherein one first cable connection portion 103 is on the first metal sub-part for connecting with the cable 4, and another first cable connection portion 103 is on the second metal sub-part. The second cable connection portion 203 of the second metal part 20 is on the second metal sub-part. The first cable connection portion 103 on the second metal sub-part of the first metal part 10 is electrically connected with the second cable connection portion 203 on the second metal sub-part of the second metal part 20 (such as cable connection, and threaded connection through conductive terminal, etc.).

Alternatively, the first metal part 10 includes two first cable connection portions 103, wherein one first cable connection portion 103 is located at the end portion of the first metal handle portion 102 for fixing the cable 4, and the other first cable connection portion 103 is located at a position of the first metal handle portion 102 close to the first metal clamping portion 101 for conductively connecting with the first conductor of the cable 4.

As for the electrical connection clamp, when the first insulation part 11 is rotatably connected to the second insulation part 21, the elastic member 3 is disposed between the side portions of the first insulation part and the second insulation part facing each other. As shown in FIG. 9 to FIG. 12, the through hole 30 of the elastic member 3 is arranged at the rotating joint between the first insulation part 11 and the second insulation part 21, wherein the rotating part (such as a rotary pin) does not extend into or extends into or passes through the through hole 30. When using one rotating part, the rotating part passes through the through hole and is connected to the first insulation part 11 and the second insulation part 21 at two ends in its extension direction. When using two rotating parts, the two rotating parts do not extend into or extend into the through hole 30, wherein one rotating part can be an independent part (such as a rotary pin), which is connected with the first insulation part 11 and/or the second insulation part 21 on one side, or can be integrally formed with the first insulation part 11 or the second insulation part 21, such that the rotatable connection between the first insulation part 11 and the second insulation part 21 can be achieved on one side; and the other rotating part can be an independent part (such as a rotary pin), which is connected with the first insulation part 11 and/or the second insulation part 21 on the other side or integrally formed with the first insulation part 11 or the second insulation part 21 on the other side, such that the rotatable connection between the first insulation part 11 and the second insulation part 21 can be achieved on the other side. The first arm portion 31 and the second arm portion 32 are respectively abutted against the side portions of the first insulation handle portion 110 and the second insulation handle portion facing each other. At this time, other structures of the elastic member 3 are similar to those of the elastic member 3 when the first metal part 10 and the second metal part 20 are connected, and therefore, details are not repeated here.

In addition, as for the electrical connection clamp, when the first insulation part 11 and the second insulation part 21 are rotationally connected, the first metal part 10 and the second metal part 20 are arranged on the same side of the axis of the rotating part. The first metal part 10 is provided with a first metal clamping portion 101 corresponding to the first insulation clamping portion 111 and at least one first cable connection portion 103, and the second metal part 20 is provided with a second metal clamping portion 201 corresponding to the second insulation clamping portion and a second cable connection portion 203. One first cable connection portion 103 and a second cable connection portion 203 are electrically connected through a conductive part such as a cable. When only one first cable connection portion 103 is used, the number of cables 4 connected to the first cable connection portion 103 is greater than the number of cables 4 connected to the second cable connection portion 203. That is to say, in addition to connecting with the cable 4 that can be connected to the power supply, the first cable connection portion 103 is also connected with a reinforced cable 4, that is, the two ends of the reinforced cable 4 are connected to the first cable connection portion 103 and the second cable connection portion 203 respectively, and such arrangement can increase the conduction effect of the electrical connection clamp. At this time, the surface area of the first cable connection portion 103 is greater than the surface area of the second cable connection portion 203. When two first cable connection portions 103 are adopted, one is used to connect to the cable 4 connecting to the power supply, and the other is used to connect to the second cable connection portion 203.

In addition, as for the electrical connection clamp, when the first insulation part 11 and the second insulation part 21 are rotatably connected, the structure of the first accommodating groove 112 and the second accommodating groove formed by the first insulation handle portion 110 and the second insulation handle portion respectively will not be described in detail. In addition, a retaining bar 1104 is provided in the second accommodating groove, wherein the retaining bar 1104 connects both sides of the second accommodating groove in the width direction, and the retaining bar 1104 is connected with the horizontal side of the second arm portion 32, thereby limiting the second arm portion 32 in the length direction.

In addition, in order to ensure the strength and rigidity of the overall structure of the electrical connection clamp, mechanical connection such as threaded connection and/or snap-fit are provided between the first metal part 10 and the first insulation part 11 and between the second metal part 20 and the second insulation part 21. Taking the threaded connection between the first metal part 10 and the first insulation part 11 as an example, the first metal part 10 and the first insulation part 11 are respectively provided with a plurality of corresponding threaded holes, wherein the plurality of threaded holes are evenly distributed along the length direction of the first metal part 10 and the first insulation part 11. Furthermore, in order to facilitate the installation of the first metal part 10 and the first insulation part 11, as shown in FIG. 11-FIG. 12, a positioning hole 1010 is also provided in the first metal clamping portion 101, and the first insulation clamping portion 111 is provided with a first convex portion 1110 corresponding to the positioning hole 1010. Further, the first convex portion 1110 is also provided with a hook-shaped barb portion 11101 for further fastening after the first insulation clamping portion 111 and the first metal clamping portion 101 are connected.

According to the electrical connection clamp of the present disclosure, the opening and closing of the electrical connection clamp can be realized by rotatably connecting the first clamp arm 1 and the second clamp arm 2. The first metal clamping portion 101 and the second metal clamping portion 201 realize the conduction function of the electrical connection clamp, and the first insulation part 11 and the second insulation part 21 can ensure the safety of the user during use. By conductively connecting the first cable connection portion 103 with the second metal part 20, both the first metal part 10 and the second metal part 20 can have a stronger electrical conductivity, such that the conductive performance of the electrical connection clamp when used is increased, and the conductive performance of the electrical connection clamp is relatively stable when used.

It should be noted that there are no specific limitations on the shape and size of the parts of the above-mentioned first metal part 10 and second metal part 20, as long as the electrical connection clamp is formed into a clamp-like structure, so as to realize the technical effect that the electrical connection clamp is connected to or detached from the battery. In addition, parts such as the through hole 30 of the above elastic member 3 and the rotating part also belong to common structures in the field, so details are not repeated herein. For the elastic member 3, there are no specific restrictions on its elastic coefficient and other characteristics, as long as when the user presses the first clamp arm and the second clamp arm, the first metal clamping portion 101 and the second metal clamping portion 201 can be opened (that is, they get away from each other); and when the user releases the first clamp arm and the second clamp arm, the first metal clamping portion 101 and the second metal clamping portion 201 can get close to each other under the action of resilience force of the elastic member 3. The specific shape of each part of the above-mentioned first insulation part 11 and second insulation part 21 is not limited, as long as the technical effect of insulation can be accomplished.

Finally, it should be noted that the above-described embodiments are only specific implementations of the present disclosure, which are used to illustrate the technical solutions of the present disclosure, rather than limiting it. The scope of protection of the present disclosure is not limited thereto. Although the present disclosure has been described in detail with reference to the foregoing embodiments, those of ordinary skill in the art should understand that any person familiar with the technical field within the technical scope disclosed in the present disclosure can still modify the technical solutions described in the foregoing embodiments or can easily think of changes, or equivalently replace some of the technical features; and these modifications, changes or replacements do not make the essence of the corresponding technical solutions deviate from the spirit and scope of the technical solutions of the embodiments of the present disclosure, and should be covered within the scope of protection of the present disclosure. Therefore, the protection scope of the present disclosure should be based on the protection scope of the claims.

What is claimed is:

1. An electrical connection clamp, comprising an elastic member and a first clamp arm and a second clamp arm that are rotatably connected to each other, wherein the first clamp arm comprises a first metal part and a first insulation part connecting to an outer surface of the first metal part, and the first metal part comprises a first metal clamping portion and at least one first cable connection portion; and the second clamp arm comprises a second metal part and a second insulation part connecting to an outer surface of the second metal part, and the second metal part comprises a second metal clamping portion;

the at least one first cable connection portion is electrically connected to the second metal part; and when the first clamp arm and the second clamp arm are in a clamping state, the elastic member can be elastically deformed to provide a clamping force;

wherein the first metal part and the second metal part are rotatably connected by a rotating part, wherein the elastic member comprises a through hole, a first arm portion and a second arm portion, wherein the first arm portion is in contact with an inner surface of the first metal part to form a first contact portion, and the at least one first cable connection portion is provided between the first contact portion and the first metal clamping portion, wherein the first metal part comprises a first metal handle portion, and the first insulation part comprises a first insulation handle portion corresponding to the first metal handle portion, wherein the first insulation handle portion comprises at least one first side portion, and the at least one first side part forms at least one first limiting portion for restricting movement of the first metal handle portion.

2. The electrical connection clamp according to claim 1, wherein the second arm portion is in contact with an inner surface of the second insulation part, and the first arm portion has a length different from that of the second arm portion.

3. The electrical connection clamp according to claim 1, wherein the second metal part further comprises a second cable connection portion, and the first metal part comprises two first cable connection portions, wherein a first cable connection portion close to the first metal clamping portion is electrically connected to the second cable connection portion.

4. The electrical connection clamp according to claim 1, wherein the first insulation handle portion comprises a first sub-first side portion and a second sub-first side portion, and the first sub-first side portion and the second sub-first side portion are communicated through a baffle plate.

5. The electrical connection clamp according to claim 1, wherein the first metal part and the second metal part comprise respectively a first metal sub-part and a second metal sub-part.

6. The electrical connection clamp according to claim 1, wherein the elastic member comprises a through hole, a first arm portion and a second arm portion, wherein the first arm portion is in contact with an inner surface of the first clamp arm, the second arm portion is in contact with an inner surface of the second clamp arm, and an end of the first arm portion away from the through hole is provided with a first bent portion.

7. The electrical connection clamp according to claim 6, wherein a first bent portion is provided with a second bent portion that arches towards a direction facing away from the inner surface of the first clamp arm.

* * * * *